United States Patent
Wernimont (10) Patent No.: US 10,081,759 B2
(45) Date of Patent: Sep. 25, 2018

(54) METHOD, APPARATUS, AND COMPOSITION FOR INCREASED RECOVERY OF HYDROCARBONS BY PARAFFIN AND ASPHALTENE CONTROL FROM REACTION OF FUELS AND SELECTIVE OXIDIZERS IN THE SUBTERRANEAN ENVIRONMENT

(71) Applicant: Eric John Wernimont, Oceanside, CA (US)

(72) Inventor: Eric John Wernimont, Oceanside, CA (US)

( * ) Notice: Subject to any disclaimer, the term of this patent is extended or adjusted under 35 U.S.C. 154(b) by 934 days.

(21) Appl. No.: 14/024,853

(22) Filed: Sep. 12, 2013

(65) Prior Publication Data

US 2015/0068749 A1    Mar. 12, 2015

(51) Int. Cl.
C09K 8/58   (2006.01)
E21B 43/24  (2006.01)
(Continued)

(52) U.S. Cl.
CPC ............. *C09K 8/58* (2013.01); *C09K 8/032* (2013.01); *C09K 8/592* (2013.01); *C09K 8/76* (2013.01);
(Continued)

(58) Field of Classification Search
CPC ....... C09K 8/58; E21B 43/126; E21B 43/243; E21B 43/247; E21B 43/255
See application file for complete search history.

(56) References Cited

U.S. PATENT DOCUMENTS

| | | |
|---|---|---|
| 2,871,941 A | 2/1959 | Allen et al. |
| 3,235,006 A | 2/1966 | Hujsak |
| 3,385,898 A | 5/1968 | Vanderwerff |
| 3,561,533 A | 2/1971 | McKinnell |
| 3,777,816 A | 12/1973 | Meier |

(Continued)

OTHER PUBLICATIONS

DOE, DOE Office of Petroleum Reserves—Strategic Unconventional Fuels, Fact Sheet: U.S. Heavy Oil Resource Potential, Jun. 18, 2007.

(Continued)

*Primary Examiner* — Zakiya W Bates
*Assistant Examiner* — Crystal J Miller
(74) *Attorney, Agent, or Firm* — Chicago IP Law; Steven M. Evans (57) ABSTRACT

A method, apparatus and composition for safe energy delivery down hole resulting in increased recovery of subterranean hydrocarbons. The method utilizes, for example, the reaction of non-alkane fuels and selective oxidizers which are non-selective toward alkane chemical compounds. The method further utilizes an acid solution reaction with aforementioned reaction for elimination of any insoluble products of reaction permitting flow within formation strata. The energy released in the subterranean reaction is utilized to heat the production tubing, the wellbore, the formation or the formation hydrocarbons thereby lowering fluid viscosity and permitting greater flow especially for heavy oils, asphaltene deposits and/or paraffin deposits. Further, safe delivery of oxidizers can be accomplished without limit on depth as the selective oxidizer may be delivered to point of use down hole as most all formations of interest contain primarily alkane hydrocarbons and will not react with the non-alkane selective oxidizer.

30 Claims, 2 Drawing Sheets

(51) Int. Cl.

| | | |
|---|---|---|
| *E21B 43/12* | (2006.01) | |
| *E21B 43/25* | (2006.01) | |
| *E21B 43/243* | (2006.01) | |
| *E21B 43/247* | (2006.01) | |
| *C09K 8/03* | (2006.01) | |
| *C09K 8/592* | (2006.01) | |
| *C09K 8/76* | (2006.01) | |
| *C09K 8/80* | (2006.01) | |
| *C09K 8/524* | (2006.01) | |

(52) U.S. Cl.
CPC .............. *C09K 8/80* (2013.01); *E21B 43/126* (2013.01); *E21B 43/243* (2013.01); *E21B 43/247* (2013.01); *E21B 43/255* (2013.01); *C09K 8/524* (2013.01); *C09K 2208/12* (2013.01); *C09K 2208/26* (2013.01); *C09K 2208/28* (2013.01); *C09K 2208/32* (2013.01)

(56) References Cited

U.S. PATENT DOCUMENTS

| | | | |
|---|---|---|---|
| 4,068,719 | A | 1/1978 | Clampitt et al. |
| 4,178,993 | A | 12/1979 | Richardson et al. |
| 4,453,597 | A | 6/1984 | Brown et al. |
| 4,648,835 | A | 3/1987 | Eisenhawer et al. |
| 4,966,235 | A | 10/1990 | Gregoli et al. |
| 5,004,050 | A | 4/1991 | Sizonenko et al. |
| 5,255,742 | A | 10/1993 | Mikus |
| 5,404,952 | A | 4/1995 | Vinegar et al. |
| 5,967,233 | A | 10/1999 | Riese et al. |
| 6,488,086 | B1 | 12/2002 | Daragan et al. |
| 7,030,279 | B1 | 4/2006 | Tanielyan et al. |
| 7,360,588 | B2 | 4/2008 | Vinegar et al. |
| 7,825,073 | B2 | 11/2010 | Welton et al. |
| 8,047,285 | B1 | 11/2011 | Smith |
| 8,132,628 | B2* | 3/2012 | Sanders ............... E21B 43/164 166/262 |
| 8,347,973 | B2* | 1/2013 | Sanders ............... E21B 43/164 166/262 |
| 8,496,066 | B2* | 7/2013 | Sanders ............... E21B 43/164 166/262 |
| 8,881,837 | B2* | 11/2014 | Sanders ............... E21B 43/164 166/262 |
| 8,962,536 | B2* | 2/2015 | Winslow ............... C09K 8/584 166/272.1 |
| 2005/0239661 | A1 | 10/2005 | Pfefferle |
| 2009/0130732 | A1 | 5/2009 | Fedorak et al. |
| 2009/0205821 | A1 | 8/2009 | Smith |
| 2009/0260808 | A1 | 10/2009 | Wellington et al. |
| 2009/0308613 | A1 | 12/2009 | Smith |
| 2010/0252266 | A1 | 10/2010 | Huang et al. |
| 2011/0120717 | A1 | 5/2011 | LaMont et al. |
| 2011/0209869 | A1 | 9/2011 | Smith |
| 2011/0259592 | A1 | 10/2011 | Reyes |
| 2012/0152536 | A1* | 6/2012 | Winslow ............... C09K 8/584 166/272.1 |
| 2012/0160486 | A1 | 6/2012 | Wigand et al. |
| 2012/0175114 | A1 | 7/2012 | Wigand et al. |
| 2012/0175115 | A1 | 7/2012 | Wigand et al. |
| 2012/0175116 | A1 | 7/2012 | Wigand et al. |
| 2012/0273210 | A1 | 11/2012 | Arizmendi et al. |
| 2013/0146288 | A1 | 6/2013 | Smith et al. |
| 2014/0096958 | A1* | 4/2014 | Wernimont ............... 166/268 |

OTHER PUBLICATIONS

M. Prats, Thermal Recovery. 2nd Ed. SPE Monograph Series, 1985, vol. 7, pp. 119-121, Society of Petroleum Engineers, Richardson, TX.

ASTM D1500 Standard Test Method for Color of Petroleum Products (2003).

Pagliaro et al. The Future of Glycerol—Selective Oxidation, Royal Society of Chemistry (2010).

Dijksman, A. et al., Efficient and Select. Aerobic Oxid. of Alcohols into Aldehydes and Ketones using Ruthenium/TEMPO as the Catalytic System, J. of A.C.S.(2001) 123, 6826-33.

Highet, R.J., Wildman, W.C., Solid Manganese Dioxide as an Oxidizing Agent. American Chemical Society (1955), 77, pp. 4399-4401.

Schumb, W.C., et al., Hydrogen Peroxide. Part Three, Report No. 44, ONR NR-092-008 Cambridge, Mass.: MIT (1954), pp. 70 & pp. 198-201.

Wernimont, E.J., Hydrogen Peroxide Catalyst Beds: Lighter and Better than Liquid Injectors, paper AIAA-2005-4455, 41st JPC, Tucson, AZ (Jul. 10-13, 2005).

Romakh, V.B., Oxidation of Alkanes, Alkenes and Alcohols Catalyzed by Transition Metal Complexes, PhD Thesis, Sep. 2006, Universite de Neuchatel, Neuchatel, Switzerland.

Kosta J. Leontaritis, "The Asphaltene and Wax Deposition Envelopes", Fuel Science and Technology International, 1996, pp. 13-39, vol. 14, Issue 1 & 2, Marcel Dekker Inc., New York, USA.

Wikipedia, Petroleum, <http://en.wikipedia.org/wiki/Petroleum. as of Dec. 4, 2012.

T.I. Michell, et al., "Field Application of a Chemical Heat and Nitrogen Generating System", 1984, SPE 12776, Society of Petroleum Engineers, Dallas, Texas, USA.

H.W. McSpadden, et al., "In-Situ Heat and Paraffin Inhibitor Combination Prove Cost Effective in NPR #3, Casper, Wyoming", 1986, SPE 15098, Society of Petroleum Engineers, Richardson, Texas, USA.

K.M. Barker, et al., "Cost-Efficient Treatment Programs for Paraffin Control", 2003, SPE 80903, Society of Petroleum Engineers, Richardson, Texas, USA.

C.E. Reistle Jr., O.C. Blade, "Paraffin and Congealing-Oil Problems with a Chapter on a Laboratory Study of Wax Rods", 1932, U.S. Department of Commerce, Bureau of Mines. Bulletin 348, United States Government Printing Office, Washington, D.C., USA.

A.B. Donaldson, "Reflection on a Downhole Stream Generator Program", 1997, SPE 38276, Society of Petroleum Engineers, Richardson, Texas, USA.

B.W. Marshall, "Field Test of Two High-Pressure, Direct Contact Downhole Steam Generators, vol. I. Air/Diesel System", 1983, SAND83-0145/I, Sandia National Laboratories, Albuquerque, NM, USA.

Wikipedia, Pegasus (rocket), https://en.wikipedia.org/wiki/Pegasus_(rocket) as of Sep. 18, 2016.

Kassebom M., et al., "Orbcomm—System Status, Evolution and Applications", DLR/Koln-Porz, Mar. 27-28, 2003.

Matney, M., et al, "Characterization of the Breakup of the Pegasus Rocket Body 1994-029B", Second European Conference on Space Debis, Mar. 1997.

Wikipedia, Stoichiometry, https://en.wikipedia.org/wiki/Stoichiometry as of Jul. 11, 2015.

Wikipedia, Air-fuel ratio, https://en.wikipedia.org/wiki/Air%E2%80%93fuel_ratio as of Nov 14, 2015.

Engineering Toolbox, Stoichiometric combustion, http://www.engineeringtoolbox.com/stoichiometric-combustion-d_399.html as of Jul. 11, 2015.

Wikipedia, Staged combustion cycle, https://en.wikipedia.org/wiki/Staged_combustion_cycle as of Jul. 11, 2015.

Wikipedia, Fuel, https://en.wikipedia.org/wiki/Fuel as of Nov 14, 2015.

Wikipedia, Potassium permanganate, https://en.wikipedia.org/wiki/Potassium_permanganate as of Nov 15, 2015.

* cited by examiner

METHOD, APPARATUS, AND COMPOSITION FOR INCREASED RECOVERY OF HYDROCARBONS BY PARAFFIN AND ASPHALTENE CONTROL FROM REACTION OF FUELS AND SELECTIVE OXIDIZERS IN THE SUBTERRANEAN ENVIRONMENT

CROSS-REFERENCE TO RELATED APPLICATIONS

This application claims priority to U.S. provisional Patent Application No. 61/958,123 filed Jul. 22, 2013 entitled, "Method, Apparatus and Composition for increased Recovery of Hydrocarbons by Paraffin and Asphaltene Control from Reaction of Fuels and Selective Oxidizers in the Subterranean Environment" and the disclosure of which are incorporated herein by reference.

The application is related to the same inventor's U.S. Provisional Patent Application No. 61/795,016 filed Oct. 9, 2012 entitled "Method, Apparatus and Composition to Increase Recovery of Hydrocarbons by Selective Oxidation of Fuels in the Subterranean Environment" and U.S. Nonprovisional patent application Ser. No. 13/694,864 filed Jan. 14, 2013 entitled, "Method, Apparatus and Composition to Increase Recovery of Hydrocarbons by Reaction of Selective Oxidizers and Fuels in the Subterranean Environment".

TECHNICAL FIELD

Embodiments of the present invention are generally directed toward increased oil and gas production by means of thermal stimulation in the formation, in the near wellbore formation, or in the wellbore of hydrocarbons, including specifically, for example, thermal stimulation of paraffin, asphaltene or wax which can form a solid and cause decreased recovery during production of oil and gas.

BACKGROUND ART

It is well known in the oil and gas industry that produced oil will contain at least a small fraction of hydrocarbon chains of asphaltene or paraffin which upon thermodynamic changes caused by production may lead to deposits which are commonly referred to as wax. This wax is a soft solid that forms on the inside of production tubing, surface flow lines, valves and tank bottoms. It can even form at the perforations and inside of the formation especially near the wellbore. The change in state to a soft solid is usually caused by a decrease in temperature and/or decrease in pressure of the produced hydrocarbons as they flow from the formation to the surface. These thermodynamic transitions, for example, can cause the suspended asphaltene to flocculate and cause the longer chain paraffins to phase change causing congealing.

Wax formation occurs in every oil well in the world to some degree and in the extreme cases will completely plug off production tubing. In particular these issues are of everyday concern for offshore crude flow assurance and heavy wax crudes such as those found in Utah. To date there have been many methods used to deal with this complicated problem. A U.S. Department of Commerce, Bureau of Mines report from 1932 (Bulletin 348, titled "Paraffin and Congealing-Oil Problems with a Chapter on a Laboratory Study of Wax Rods" by C. E. Reistle Jr. and O. C. Blade) shows that this has been a problem for well over 100 years and provides many solutions from that era divided into three main groups: 1) Mechanical removal such as scrapers, reamers, hydraulic methods, compressed air and explosives, 2) Solvents such as gasoline and kerosene, 3) Heat such as steam, hot water, hot gas, hot oil (all heated on surface), heat forming chemicals (combinations noted are lye/aluminum/water, calcium carbide/water and sodium peroxide/water), flame (similar to fire flooding) and electric heaters. A more recent summary of paraffin removal methods are described in sufficient detail in a 2003 conference paper by K. M. Barker, et al., SPE80903 "Cost—Effective Treatment Programs for Paraffin Control". The treatments are: Hot Oiling, Hot Watering, Cutting or Wire Lining, Pigging, Solvent or Condensate, Chemicals. The paper goes on to describe that the Hot Oiling and Hot Watering treatments are only effective for deposits that are no deeper than 150-300 m (~500-1000 ft) below the surface because the oil or water is made hot on the surface and then pumped down hole loosing energy to the earth hence limiting the depth of usefulness.

Hence to solve this problem in existing and ever deeper wells what is needed is a method to safely produce energy in the form of heat where it is needed: down hole and at depths greater than 300 m (~1,000 ft) and as far as the drill bit can go, for example. In addition the oil and gas industry has been reaching deeper and ever deeper for hydrocarbons in some cases over 9150 m (~30,000 ft).

The present disclosure discloses inter alia a method whereby a liquid oxidizer can be safely delivered to any presently known depth that a liquid fuel may also be delivered. There does exist prior methods for delivery of liquid oxidizers to bottom hole locations. Smith teaches a method to deliver hydrogen peroxide (U.S. Pat. No. 8,047,285 and U.S. patent application Ser. No. 12/424,376 and Ser. No. 13/028,883). The present disclosure is superior to this prior method that utilizes hydrogen peroxide, for example, in that hydrogen peroxide can create oil field hazards by several means. The primary of these hazards being that oxygen is produced by decomposing the hydrogen peroxide. From which, if the system is improperly operated, such produced oxygen may form a combustive/explosive mixture with methane either down hole or in the production lines. While the intention would be to consume all of this oxygen, an explosion hazard is still present and must be accounted for. Example embodiments of the present disclosure utilize what is known to those in the art as a "selective oxidizer," or an oxidizer that will only be made to react with particular compounds and ignore or greatly reduce reaction with others. This disclosure teaches example embodiments using a selective oxidizer composition that is non-selective with respect to alkane chemistry. The use of non-alkane selective oxidizer use greatly increases the safe operation in a fuel rich environment, such as a hydrocarbon reservoir, given that almost all produced hydrocarbons are of alkane chemistry. In addition, in certain aspects of the aforementioned Smith patents and applications (U.S. Pat. No. 8,047,285 and U.S. patent application Ser. No. 12/424,376 and Ser. No. 13/028,883) make use of energy release from decomposition of hydrogen peroxide using a catalyst whereas the present disclosure does not require the presence of catalyst for reaction and heat release.

SUMMARY

Embodiments of the present invention are related to enhanced production of hydrocarbons from hydrocarbon bearing subterranean formations. More specifically enhanced production is achieved, for example, by thermal stimulation of a production tubing, wellbore bottom hole, near the wellbore, and/or far afield in the formation depending upon the specific embodiment apparatus. The present invention is novel and useful in that, for example, bottom hole and reservoir energy release is accomplished by reaction of selective oxidizers that are non-selective toward alkane chemistry. Hence, the disclosed selective oxidizers are nonreactive with a vast majority of naturally occurring reservoir and produced hydrocarbons resulting in a much safer production of hydrocarbons from subterranean formations than existing methods of oxidizer utilization in the oil and gas industry. This novelty and usefulness, for example, further increases the depth at which oxidizers can be deployed in subterranean formations, for example such depth being limited only by the reach of a drill bit.

The present invention in one of its simplest embodiments, for example, would consist of a system in which two separated tanks would rest upon the surface of the earth near an existing wellbore which is utilized for hydrocarbon production. One of the tanks would hold a liquid fluid system containing an oxidizer which is non-selective toward alkane chemistry. The second tank would hold a liquid fluid system containing a fuel which would be chemically non-alkane. These two liquids would be pumped through separate fluid conduits which are inside the aforementioned well bore or one of the fluid conduits being the aforementioned well bore. The two liquids would be pumped simultaneously and in chemical proportion to maximize energy release. The two separate fluid conduits would only permit the two fluid systems to come into contact at a desired down hole location. After the two fluid systems contact one another they will mix, react and produce energy, heating the nearby materials. In addition, for example, the energy release or any possible water insoluble reaction products can be utilized for other fluid mechanical operations.

In addition, for example, this simplest embodiment would include a third separate fluid conduit from the surface of the earth to the location of mixing for the first two fluids and would pump a third fluid system which would be mixed with the reaction products of the first two fluids. The third fluid would be contained in a separate surface tank and be comprised of chemicals to reduce or eliminate the insoluble products of the first two fluids and/or contain but not be limited to acids, asphaltene inhibitors, pour point depressants, clay stabilizers, surfactants, corrosion inhibitors and de-emulsifiers, for example.

It is to be expressly understood, however, that the embodiments described herein, and each of the figures, are provided as examples and for the purpose of illustration and description only and they and use of the terms such as "the invention" or "the present invention" are not intended as a definition of the limits of the scope or embodiments of the invention. The priority application or any changes or differences, including any typographical or grammatical changes, between the present disclosure and priority U.S. Provisional Patent Application No. 61/958,123 should not be read to limit or impair the scope of the present disclosure.

BRIEF DESCRIPTION OF THE DRAWINGS

FIG. 1 illustrates one of the preferred embodiments utilized in a vertical well which contains production tubing and wherein the selective oxidizer is pumped down coiled tubing which contains two smaller capillary tubes. One capillary tube carries the non-alkane fuel and the other capillary contains an acid solution. The coiled tubing is placed in the annulus between a well casing and the production tubing of a producing oil well. The distal end of the coiled tubing contains a bottom hole assembly (BHA) which permits the selective oxidizer and the non-alkane fuel to react producing heat. The BHA further permits the acid solution to react with the products of the first two liquids and eliminates any condensed species. The fluid discharged from the BHA is displaced out into the near well bore formation thereby thermally stimulating the wellbore, lower production tubing and near wellbore region, reducing the viscosity of paraffin wax or asphaltenes present and increasing hydrocarbon production.

FIG. 2 illustrates one of the preferred embodiments utilized in a vertical well which contains production tubing and wherein the selective oxidizer is pumped down coiled tubing which contains two smaller capillary tubes. One capillary tube carries the non-alkane fuel and the other capillary contains an acid solution. The coiled tubing is placed in the production tubing of a producing oil well. The distal end of the coiled tubing contains a bottom hole assembly (BHA) which permits the selective oxidizer and the non-alkane fuel to react producing heat. The BHA further permits the acid solution to react with the products of the first two liquids and eliminates any condensed species. The fluid discharged from the BHA is displaced out into the near well bore formation thereby thermally stimulating the wellbore, lower production tubing and near wellbore region, reducing the viscosity of paraffin wax or asphaltenes present and increasing hydrocarbon production. Once thermal stimulation is complete the coiled tubing is removed and an artificial lifting device may be installed for crude oil production, for example.

DETAILED DESCRIPTION

As used herein, "a" or "an" includes one or more. Where the present disclosure refers to "perforations" it should be understood to include "one or more perforations."

As used herein, "surface" or "surface of the earth" refers to locations approximately at, or at or near the surface of the earth.

As used herein, "hydraulic fracturing" refers to a method of injecting a fluid above the fracture pressure of a subterranean reservoir into which the fluid is injected, or any propagation of fractures in a reservoir in strata (e.g. a rock layer) as a result of a pressurized fluid.

As used herein, "stimulation" refers to a method of injection a fluid below the hydraulic fracture pressure of a reservoir wherein the fluid is being injected.

As used herein "proppant" refers to any solid material that has sufficient strength to resist the overburden forces of the earth in a reservoir into which it is introduced or pumped, for example, any material that will keep a hydraulic fracture open, during or following a fracturing treatment, including for example particles which are permeable to gas.

As used herein "fluid system" refers to fluids that contain chemicals, and/or catalyst, and/or proppants, for example.

As used herein "conduit" refers to a fluid transmission path that contains a fluid and any pressure of such a fluid, for example.

As used herein "strata" includes a particular depth below the surface of the earth of solids, liquids, and gas constituents that comprise the earth with internally consistent characteristics that distinguish it from other layers.

As used herein the term "reservoir" includes a deposit of substances in any formation, stratum or strata.

As used herein "fluid" or "fluids" is defined as any liquid, plasma, gas, gel, foam, slickwater, or other substance that can deform, for example, under shear stress.

As used herein "alkane" refers to chemical compounds that consist only of hydrogen and carbon atoms and are bonded exclusively by single bonds without any cycles. Also know as a saturated hydrocarbon. Examples include methane, ethane, propane containing one, two and three carbon atoms respectively. Alkanes and Cycloalkanes are presently known to represent approximately 80% of the average crude oil composition depending upon specific natural deposits (Wikipedia, 2012. *Petroleum*. Available at: <http://en.wikipedia.org/wiki/Petroleum> as of Dec. 4, 2012.) Whereas, for example, the hydrocarbons present in natural gas and natural gas liquids are almost completely alkane chemistry depending upon specific natural deposits.

As used herein "alkene" refers to chemical compounds that consist only of hydrogen and carbon atoms containing at least one carbon-to-carbon double bond. Also known as unsaturated hydrocarbons. These chemical compounds are typically industrially produced by hydrocarbon cracking of natural gas liquids.

As used herein "alkyne" refers to chemical compounds that consist only of hydrogen and carbon atoms containing at least one carbon-to-carbon triple bond.

As used herein "alcohol" refers to organic chemical compounds containing at least one hydroxyl group bonded to a carbon atom. Examples are ethanol, methanol and glycerol, a polyol (an alcohol having more than one hydroxyl group).

As used herein "selective oxidation" refers to the preferential attack by oxygen within an oxidizing agent on one or more of the chemical components in a material; for example, use of an oxidizer that will only be made to react with particular compounds and ignore or greatly reduce reaction with others.

As used herein "asphaltene" includes a definition adopted by Kosta J. Leontaritis, "The Asphaltene and Wax Deposition Envelopes", Fuel Science and Technology International, Vol. 14, Issue 1 & 2, pp. 13-39, 1996. Asphaltenes are highly condensed polyaromatic structures of molecules, containing heteroatoms (i.e. S, O, N) and metal (e.g. Va, Ni) that exist in petroleum in an aggregated state in the form of suspension and are surrounded and stabilized by resins (i.e. peptizing agents). They are known to carry an electrical charge, and thought to be polydisperse. Asphaltenes are a solubility class, hence they are not pure, identical molecules.

As used herein "paraffin", "wax" or "paraffin wax" primarily refers to aliphatic hydrocarbons (both straight and branched chain) that change state from liquid to solid during conventional oil production and processing operations, for example. In addition to aliphatics, field deposits usually contain aromatic, naphthenic, resin, and asphaltenic molecules as well. The combined mass is called "wax". Paraffin waxes usually melt between ~43-71 C (110-160 F). Field waxes contain molecules that can have melting points in excess of ~93 C (200 F). Definition adopted by Kosta J. Leontaritis, "The Asphaltene and Wax Deposition Envelopes", Fuel Science and Technology International, Vol. 14, Issue 1 & 2, pp. 13-39, 1996.

Embodiments of the present invention relate to use of thermal energy to increase recovery of subterranean hydrocarbons and ultimately to increase hydrocarbon recovery from a specific formation or strata. The embodiments of this invention, for example, direct energy where it is most efficiently utilized in the near bottom hole, well bore, near well bore, and far afield in the formation from the well bore. The example embodiments outlined in the present disclosure are directed toward deep (>300 m (~1000 ft)) paraffin and asphaltene scale and its treatment. However, embodiments of the present invention may also find use with, for example, but not limited to, horizontal wells, heavy oil production, high paraffin content crude oil production, oil sands production, high kerogen strata such as oil shale where increases in local temperature result in significant changes in fluid viscosity, hydraulic fracturing and enhanced oil recovery by flooding due to the nature of the products of reaction.

In one embodiment the energy is released down hole near the perforations in the wellbore and the reaction products are comingled with the fluids produced from a formation resulting in increased temperature and better flow assurance of formation fluids including hydrocarbons up the production tubing and/or wellbore to the surface of the earth. In another embodiment the energy is released partially in the well bore near the perforations through the well casing allowing fluid communication between the wellbore and the formation and also near the well bore out into the formation depending on flow rates and reaction rates. This release of energy results, for example, in near wellbore heating of fluids, and after a heat soaking period the reaction products and formation hydrocarbons are then produced to the surface of the earth.

In one embodiment the energy is released partly in the wellbore but mostly in the near wellbore formation and far afield in the formation. In this embodiment, the far afield is heated and swept with the reaction products and is produced out of another well, for example.

Figure 1:
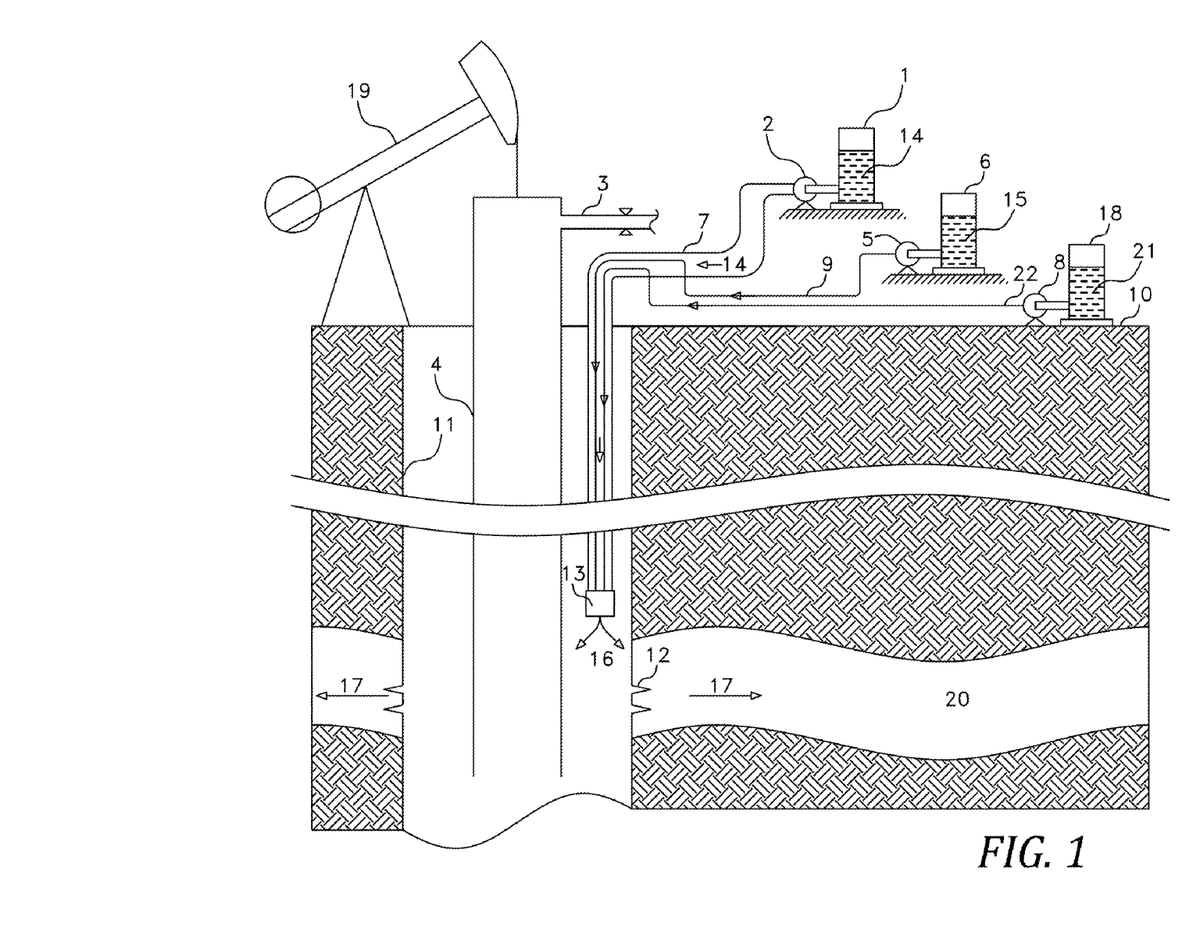

Attention is first directed to FIG. 1, which shows a preferred embodiment of an injection system apparatus implementing certain aspects of the present invention, for example. Referring to FIG. 1 there is a well casing 11 that is disposed into a wellbore. Well casing 11 has perforations 12 that allow a fluid 16, which is the reaction products of and mixed combination of fluid 15 and fluid 14 followed by fluid 21, inside well casing 11 to flow out into a subterranean formation 20 where the hot reaction products heat the near wellbore paraffin and/or asphaltene deposits and permit such to flow more readily.

FIG. 1 Injection system apparatus further includes tank components 1, 6 and 18 in fluid communication with the well casing 11. In one embodiment fluid communication of tank component 1 and the Bottom Hole Assembly (BHA) is with a coiled tubing 7 which is disposed in the annulus between the well casing 11 and the production tubing 4. Further the fluid communication between tank components 6 and 18 and the BHA 13 is with capillary tubing 9 and 22 respectfully which is disposed within the coiled tubing 7. Said BHA 13 is located at a bottom hole location which is above the perforations 12.

In reference to FIG. 1 in one embodiment a fluid 14, at least partially comprising a selective oxidizing agent that is non-selective toward alkane chemistry, is injected using a pump 2 through a conduit 7. A fluid 15 contained in a tank 6 is at least partially comprised of a non-alkane fuel which fluid is injected using a pump 5 through a capillary conduit 9 down to near bottom hole. A fluid 21 is at least partially comprised of an acid solution is injected using a pump 8 through capillary tube 22 down to the BHA 12 wherein it reacts at least partially with the reaction products of fluids 14 and 15. In one embodiment bottom hole assembly 13 is designed to jet out a completely reacted fluid 16 prior to delivery through perforations 12 and out into a formation 20. A production tubing 4 is connected to a surface conduit 3 which is closed during this operation, for example. As shown in FIG. 1 the production tubing is connected to an artificial lift device such as a pump jack 19. In one embodiment pumps 5, 2 and 8 are operated above hydraulic fracture pressure of formation 20 and at least a portion of BHA 13 discharge fluid 16 are used as a proppant. In another embodiment, pumps 5, 2 and 8 are operated below hydraulic fracture pressure of a formation 20, for example. Alternatively or in addition, a fluid 14 could be injected substantially at the same time as a fluid 15 or alternating or in proportions being oxidizer rich or alternatively fuel rich. And or in addition, coiled tubing 7 could be replaced by those knowledgeable in the art with a capillary tubing or a production tubing and hung off at or near surface 10. Alternatively, a fluid 15 could be at least partially comprised of selective oxidizer which is non-selective toward alkanes, and a fluid 14 at least partially comprised of non-alkane fuel. In addition a fluid 21 could be injected such that the BHA 13 discharge fluid 16 would be acidic or basic.

Figure 2:
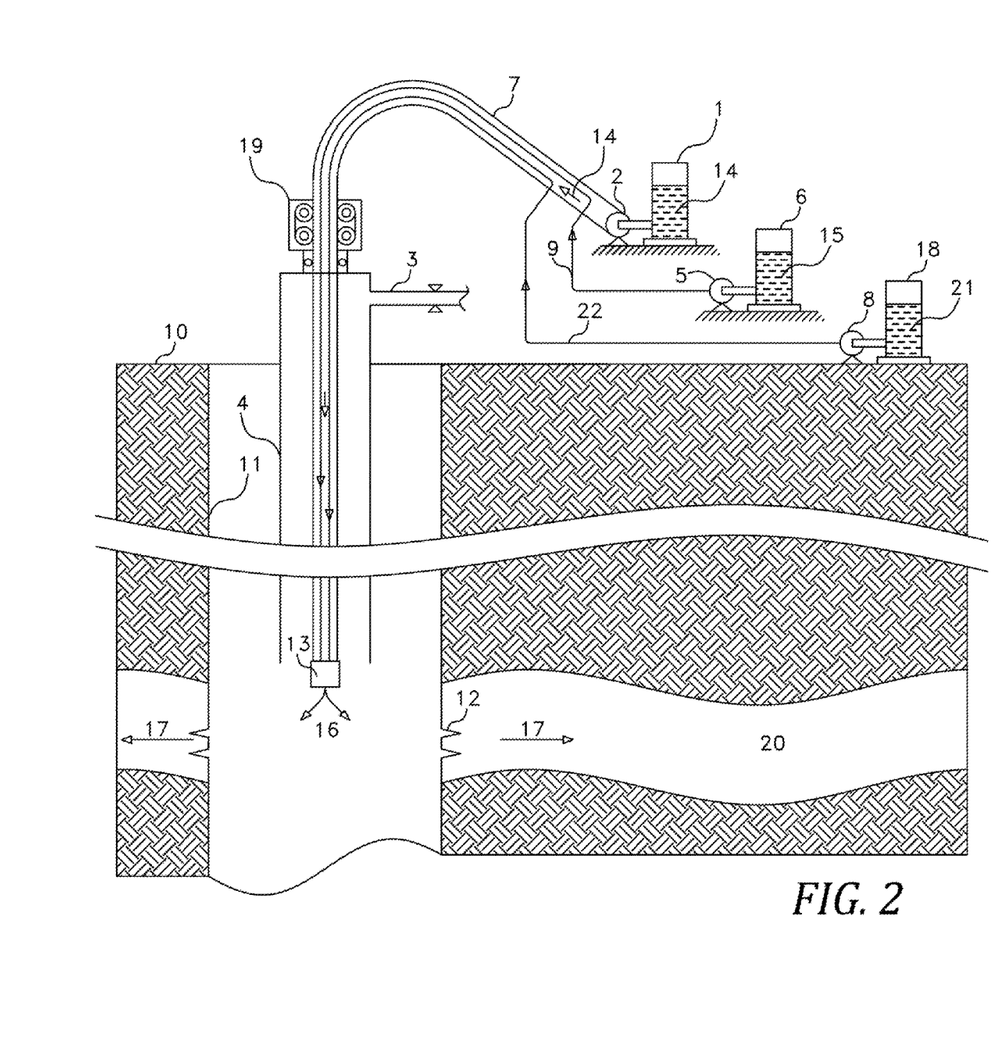

FIG. 2 shows a preferred embodiment of an injection system apparatus implementing certain aspects of the present invention, for example. Referring to FIG. 2 there is a well casing 11 that is disposed into a wellbore. Well casing 11 has perforations 12 that allow a fluid 16, which is the reaction products of and mixed combination of fluid 15 and fluid 14 followed by fluid 21, inside well casing 11 to flow out into a subterranean formation 20 where the hot reaction products heat the near wellbore paraffin and/or asphaltene deposits and permit such to flow more readily.

FIG. 2 Injection system apparatus further includes tank components 1, 6 and 18 in fluid communication with the well casing 11. In one embodiment fluid communication of tank component 1 and the BHA is with a coiled tubing 7 which is disposed within production tubing 4. Further the fluid communication between tank components 6 and 18 and the BHA 13 is with capillary tubing 9 and 22 respectfully which is disposed within the coiled tubing 7. Said BHA 13 is located at a bottom hole location which is above the perforations 12.

In reference to FIG. 2 in one embodiment a fluid 14, at least partially comprising a selective oxidizing agent that is non-selective toward alkane chemistry, is injected using a pump 2 through a conduit 7. A fluid 15 contained in a tank 6 is at least partially comprised of a non-alkane fuel which fluid is injected using a pump 5 through a capillary conduit 9 down to near bottom hole. A fluid 21 is at least partially comprised of an acid solution is injected using a pump 8 through capillary tube 22 down to the BHA 13 wherein it reacts at least partially with the reaction products of fluids 14 and 15. In one embodiment bottom hole assembly 13 is designed to jet out a completely reacted fluid 16 prior to delivery through perforations 12 and out into a formation 20. A production tubing 4 is connected to a surface conduit 3 which is closed during this operation, for example. As shown in FIG. 2 the coiled tubing 7 is connected to the production tubing 4 with a coiled tubing injection head 19. In one embodiment pumps 5, 2 and 8 are operated above hydraulic fracture pressure of formation 20 and at least a portion of BHA 13 discharge fluid 16 are used as a proppant. In another embodiment, pumps 5, 2 and 8 are operated below hydraulic fracture pressure of a formation 20, for example. Alternatively or in addition, a fluid 14 could be injected substantially at the same time as a fluid 15 or alternating or in proportions being oxidizer rich or alternatively fuel rich. And or in addition, coiled tubing 7 could be replaced by those knowledgeable in the art with a capillary tubing or a production tubing and hung off at or near surface 10. Alternatively, a fluid 15 could be at least partially comprised of selective oxidizer which is non-selective toward alkanes, and a fluid 14 at least partially comprised of non-alkane fuel. In addition a fluid 21 could be injected such that the BHA 13 discharge fluid 16 would be acidic or basic.

It is understood that known aspects of hydraulic fracturing can be used in conjunction with embodiments of the present invention. As such, for example, in addition, fluid 14, fluid 15 and/or fluid 21 of FIGS. 1 & 2 can also contain at least in part, as known by those knowledgeable in the art, friction reducers, gelling agents, corrosion inhibitors, de-emulsifiers, asphaltic inhibitors, pour point depressants, clay stabilizers and/or proppants or propping agents, for example.

In another preferred embodiment, members of the permanganate family are selected at least in part as the selective oxidizing agents in fluid 14 of FIGS. 1 & 2, for example. An additional embodiment utilizes alkenes, alkynes and/or alcohols at least in part as a fuel in fluid 15 of FIGS. 1 & 2. For example, a preferred embodiment utilizing saturated potassium permanganate (~22 wt %) in water initially at 60 C (140 F) as the fluid 14 of FIGS. 1 & 2 and utilizing an alcohol, glycerol for example, as a fuel of fluid 15 of FIGS. 1 & 2, accomplishes a chemical reaction which creates an approximate theoretical adiabatic reaction temperature of 232 C (450 F). The balanced chemical reaction for this described embodiment can be written as:

$$3C_3H_5(OH)_3 + 14KMnO_4 + 358.7H_2O \rightarrow 14MnO_2 + 14KOH + 9CO_2 + 363.7H_2O$$

Or alternatively for Manganese (III) Oxide reaction products:

$$4C_3H_5(OH)_3 + 14KMnO_4 + 358.7H_2O \rightarrow 7Mn_2O_3 + 7K_2CO_3 + 5CO_2 + 374.7H_2O$$

In an additional embodiment, one of the products of reaction noted would be the insoluble solid of Manganese Dioxide (MnO2) also known as Manganese (IV) Oxide, for example. Alternatively or in addition, fluid 21 may contain an acid solution at least partially comprised of oxalic acid and at least partially of hydrochloric acid, for example. The fluid 21 reaction with the insoluble solid, leading to the balanced chemical reaction (written without the water portion of the acid solutions) creating water soluble and low toxicity Manganese Chloride:

$$MnO_2 + C_2H_2O_4 + 2HCl \rightarrow MnCl_2 + 2CO_2 + 2H_2O$$

In some cases this reaction can be referred to as autocatalytic if as is the case in the above the ions of the product act as a catalyst for the forward reaction.

In a further embodiment of those illustrated in FIGS. 1 & 2 is that the BHA 13 may be placed above or below the perforations and/or above or below the bottom of the production tubing.

In a further embodiment of those illustrated in FIGS. 1 & 2 is that the fluid discharge 16 from BHA 13 may be substantially directed up the production tubing rather than the formation and comingled with produced formation fluids.

In a further embodiment of those illustrated in FIGS. 1 & 2 is that the fluid discharge 16 from the BHA 13 may be used to thermally stimulate heavy oil, heavy oil formations, to treat inorganic scale deposits and/or to provide hot acid treatments at bottom hole locations.

In a further embodiment of those illustrated in FIGS. 1 & 2 is that the fluid conduits of 7, 9 & 22 may be individual and are bundled into a single coil by means of plastic overwrap.

As described, embodiments of the present invention are fundamentally different than other prior methods such as those disclosed in U.S. patent application publications nos. US2012/0160486, US2012/0175114, US2012/0175115 & US2012/0175116 which utilize permanganates in the subterranean environment. For instance, these prior disclosures relate to the use of oxidizers for chemical modification of in situ kerogen. As such, permanganates are mentioned merely as an example of an oxidizer and make no mention of the use of selective oxidizers, for example. In addition, the mentioned prior disclosures differ from embodiments of the present invention in that the prior disclosures use a fuel that is already in the formation, whereas an embodiment of the present invention, for example, utilizes a fuel which is pumped down from surface and is at least partially a non-alkane chemical. A further difference is that embodiments of the present invention, for example, relate to energy generation down hole to create temperature changes whereas the aforementioned prior disclosures relate only to chemical manipulation.

U.S. Pat. No. 4,648,835 discloses a bottom hole combustor design utilizing air, water and fuel from surface, and ignition methods and chemistry to make steam in the well bore down hole. Further information about field application of U.S. Pat. No. 4,748,835 is provided in a 1997 SPE paper 38276 by A. B. Donaldson entitled "Reflections on a Downhole Steam Generator Program" and in a 1983 Sandia National Labs report by B. W. Marshall entitled "Field Test of Two High-Pressure, Direct-Contact Downhole Steam Generators, Volume I. Air/Diesel System". Example embodiments of the present invention teaches new and novel aspects not covered under said patent, those being delivery of a selective oxidizer that is non-selective toward alkanes, for example. U.S. Pat. No. 4,648,835 utilizes air containing oxygen that will oxidize with alkane chemistry whereas, for example, the present invention will not prefer to oxidize alkane chemical fuels. In addition, example embodiments of the invention disclosed herein inject a liquid fluid, for example, whereas the aforementioned U.S. patent uses gaseous oxidizers. In addition, in the aforementioned U.S. patent, energy release is inside the well bore whereas in example embodiments of the present invention energy release may occur at least partially out into the formation, for example.

U.S. Pat. No. 5,004,050 utilizes oxidizers inside a device placed inside the well bore as a portion of dielectrics that are set off by electrical discharge thereby creating a shockwave that travels into the formation, where such oxidizers are in some specific mentions similar to oxidizers in example embodiments of the invention herein. Example embodiments of the present invention, however, are different in that oxidizers are utilized to create thermal energy and not as dielectrics for creation of pressure energy, for example. In addition the method described by U.S. Pat. No. 5,004,050 utilizes oxidizers and not selective oxidizers as is the case for the present invention.

U.S. Pat. No. 5,967,233 discloses pumping liquid oxidizers, which in some specific mentions are similar to example embodiments of the invention herein, into a coal formation and permitting the oxidizer to react with the formation resulting in increased methane production. Example embodiments of the present invention, however, are different in that they utilize selective oxidizers which are non-selective to alkanes, for example, and in addition would likely not react as in the method described by U.S. Pat. No. 5,967,233. In addition, example embodiments of the present disclosure are for release of energy in subterranean environment rather than chemical modification of reservoir fuels and, in addition, example embodiments of the present invention utilize at least in part non-alkane fuels pumped down hole from the surface and do not utilize in situ fuels, for example.

U.S. patent application publication no. US2009/0130732 discloses use of oxidizers that in some specific mentions are similar to those in embodiments of the invention herein but the aforementioned publication is for chemical manipulation of heavy oils on the surface of the earth after having been physically removed from the subterranean environment, whereas example embodiments of the present invention do not chemically change the down hole hydrocarbons, for example. And, in addition, example embodiments of the present invention are for the generation of energy down hole, whereas the aforementioned publication does not, for example.

U.S. Pat. No. 4,178,993 disclosure which is further described in SPE papers 12776 and 15098 (respectfully entitled "Field Application of a Chemical Heat and Nitrogen Generating System" and "In-Situ Heat and Paraffin Inhibitor Combination Prove Cost Effective in NPR #3, Casper, Wyo.") discloses use of nitrogen producing energetic reaction for paraffin treatment. In the aforementioned patent the nitrogen generation is primarily utilized as a gas lift method to remove liquids in a gas well. In the aforementioned SPE papers the same chemistry utilizes the nitrogen and the heat generated to treat paraffin deposits near the perforations. The specific chemistry uses sodium nitrate and ammonium chloride which is mixed on surface and introduced as slugs requiring fairly exact timing between pumping rates and reaction completion. Hence, the present disclosure is different in many ways, the foremost being the prior art does not utilize a selective oxidizer nor does it permit continuous operation. In addition, the present disclosure primary products of reaction are hot liquid as opposed to nitrogen.

U.S. Pat. No. 3,561,533 discloses use of reacting chemicals that produce heat and foam within a well utilizing reactants hydrogen peroxide/hydrazine, unsymmetrical dimethyl hydrazine/peroxide, fuming nitric acid/hypergolic fuels in combination with foaming agents to help distribute the energy released upon reaction. The present disclosure differs significantly from the aforementioned patent in the delivery is via coiled tubing or capillary tubing and does not make use of selective oxidizers for safe down hole reaction.

The inventor conducted several ambient pressure tests in glass beakers to verify reaction products and heat release from reaction compared to theoretical. Several combinations of reactants were first theoretically examined for safety, cost and operability in the subterranean environment on a per unit energy basis. The following beaker test example further illustrates the invention.

EXAMPLE

It should be noted that the test was conducted at lower concentrations than would likely be used in a well stimulation because the test was conducted at ambient pressure. If higher concentrations were to be used at ambient pressure the reactions would heat the solution beyond the boiling point of water and making observations problematic. In a 600 ml beaker an approximately 120 g solution of potassium permanganate in distilled water at 6.1 g/100 ml concentration of permanganate. The apparatus included a magnetic stirrer in the beaker and a stainless steel thermocouple probe measuring the solution temperature just off the bottom of the beaker. The solution was heated to roughly 37 C (~100 F) and was a dark purple color. To this solution approximately 1.6 g of glycerol was added via syringe and needle metering out the mass in droplets. Over the span of approximately 3 minutes the solution was noted to change to a dirt brown color (indicating the presence of $MnO_2$) and temperature was seen to rise to over 68 C (~155 F). This is within 6 C (~10 F) of theoretical and is in approximate agreement given the lack of insulation. No foul smells were observed nor were bubbles seen forming and the solution was observed to be slightly basic in prior tests. To the brown solution was added less than 100 g of a solution of a combination of 10% oxalic and 15% hydrochloric acids which were initially heated to 37 C (~100 F). Upon contact of the two solutions rapid evolution of carbon dioxide is observed until the mixed solution turns a light black ink color and finally becomes completely clear. Again no foul smells were observed and solution temperature was observed to stay roughly constant indicating the reaction is slightly exothermic and was able to overcome the thermal dilution from the addition of the cooler 37 C (~100 F) solution.

Although the present disclosure and its advantages have been described in detail, it should be understood that various changes, substitutions, additions, and alterations can be made herein without departing from the spirit and scope of the present disclosure, and/or as defined by the appended claims. As one of ordinary skill in the arts of hydrocarbon extraction, water extraction, mining, and oxidation reactions will readily appreciate from the disclosure of the present disclosure, processes, devices, manufacture, compositions of matter, means, methods, or steps, presently existing or later to be developed that perform substantially the same function or achieve substantially the same result as the corresponding embodiments described herein may be utilized according to the present disclosure. Accordingly, one or more of the appended claims can include within their scope such processes, devices, manufacture, compositions of matter, means, methods, or steps.

The invention claimed is:

1. A method for recovery of hydrocarbons from a subterranean formation, strata, or at least one subterranean reservoir comprising:
   a. Injecting at least one liquid first fluid from the surface of the earth through at least one conduit into at least one wellbore with one or more perforations for contact with a subterranean reservoir of hydrocarbons, to a location down said wellbore next to said one or more perforations;
   b. Said wellbore being in fluid communication with at least one subterranean formation;
   c. Said injected first fluid at least partially comprising an oxidizing agent;
   d. Said oxidizing agent comprising a selective oxidizing agent which is non-selective in reaction toward alkane chemistry and is for use as a selective oxidizing agent in a combustion reaction in said method;
   e. Injecting at least a second fluid comprised at least partially of a non-alkane fuel from the surface of the earth through at least one conduit into said wellbore to a location down said wellbore next to said one or more perforations, wherein said non-alkane fuel is made of a organic chemical compound and is for use as a fuel in a combustion reaction in said method;
   f. At a time after a said first fluid and a said second fluid are injected to a location down said wellbore next to said one or more perforations, reaction of said oxidizing agent at least partially with said non-alkane fuel in a combustion reaction to release energy including heat and create one or more reaction products of said combustion reaction;
   g. Injecting at least a third fluid comprised at least partially of a acid solution from the surface of the earth through at least one conduit into said wellbore to a location down said wellbore next to said one or more perforations, wherein said acid solution is for use to react with one or more reaction products of a combustion reaction in said system;
   h. At a time after completion of a said combustion reaction and after a said third fluid is injected to a location down said wellbore next to said one or more perforations and before said heat of said combustion reaction is dissipated, reaction of said acid solution with said reaction products of said combustion reaction of said oxidizing agent with said fuel, wherein said reaction of said acid solution with said reaction products of said combustion reaction:
      (1) is operable to remove said reaction products of said combustion reaction; and
      (2) is an exothermic reaction, resulting in additional energy release including additional heat;
   i. Recovery back to the surface of the earth of one or more subterranean hydrocarbons.

2. The method of claim 1 wherein the said selective oxidizing agent comprises $KMnO_4$ for use as a selective oxidizing agent in a combustion reaction in said method.

3. The method of claim 1 wherein the said selective oxidizing agent comprises: Sodium Dichromate ($Na_2Cr_2O_7$), Ammonium Permanganate ($NH_4MnO_4$), Calcium Permanganate ($Ca(MnO_4)_2$), or Sodium Permanganate ($NaMnO_4$), for use as a selective oxidizing agent in a combustion reaction in said method.

4. The method of claim 1 wherein the said non-alkane fuel comprises a alkene, alkene or alcohol for use as a fuel in a combustion reaction in said method.

5. The method of claim 1 wherein the said fuel comprises Glycerol ($C_3H_8O_3$) or Methanol ($CH_4O$) for use as a fuel in a combustion reaction in said method.

6. The method of claim 1 wherein said acid solution comprises a combination of: oxalic acid and hydrochloric acid.

7. The method of claim 1 wherein at least a portion of said second fluid or said third fluid comprises a reductive leaching agent.

8. The method of claim 1 wherein the said injected first fluid is heated above surface ambient temperature prior to injection.

9. The method of claim 1 wherein the said fluids are heated above surface ambient temperature prior to injection at least partially by method of heat of dilution.

10. The method of claim 1 wherein said conduit is a continuous tube having a distal end below the surface and a proximal end in said wellbore.

11. The method of claim 1 wherein said conduit is a continuous tube having a distal end below the surface and a proximal end above the surface of the earth.

12. The method of claim 1 wherein at least a portion of the said reactions occur within a distal end reactor attached to said conduits.

13. The method of claim 1 wherein said conduit is placed within at least one other said conduit.

14. The method of claim 1 wherein the reaction of the said selective oxidizing agent with the said second fluid occurs at least partially in the wellbore.

15. The method of claim 1 wherein the reaction of the said selective oxidizing agent with the said second fluid systems occurs at least partially in the said formation.

16. The method of claim 1 wherein the injection of said fluids occurs at a pressure sufficient to hydraulically fracture at least one subterranean stratum.

17. The method of claim 1 wherein the injection of said fluids occurs at a pressure below hydraulic fracture pressure of at least one subterranean stratum.

18. The method of claim 1 wherein at least a portion of the products of reaction of the said selective oxidizing agent and the said fuel are utilized as a proppant material.

19. The method of claim 1 wherein recovery back to surface of subterranean hydrocarbons is through said wellbore.

20. The method of claim 1 wherein recovery back to surface of subterranean hydrocarbons is through wellbores other than those wherein said oxidizing agent was injected.

21. The method of claim 1 wherein the reaction of said oxidizing agent and said fuel includes an amount of fuel in excess of an amount required for a stoichiometric reaction of said oxidizing agent and said fuel.

22. The method of claim 1 wherein the reaction of said oxidizing agent and said fuel includes an amount of oxidizer in excess of an amount required for a stoichiometric reaction of said oxidizing agent and said fuel.

23. The method of claim 1 wherein the reaction of said acid solution and said products of reaction of said oxidizing agent at least partially with said fuel includes an amount of acid in excess of an amount required for a stoichiometric reaction of said acid solution and said products of reaction.

24. The method of claim 1 wherein the reaction of said oxidizing agent and said fuel, and the reaction of said products of reaction of said oxidizing agent at least partially with said fuel and said acid occur at least in part inside of a bottom hole assembly.

25. The method of claim 24 wherein the bottom hole assembly is attached to the distal end of at least one said conduit.

26. The method of claim 24 wherein the bottom hole assembly utilizes at least partially a mixing tube for mixing of said oxidizer and said fuel prior to addition of said acid.

27. The method of claim 1 wherein the said reactions occur in close proximity but above the downhole location of said fluid communication with said subterranean formation.

28. The method of claim 1 wherein the said reactions occur in close proximity but below the downhole location of said fluid communication with said subterranean formation.

29. The method of claim 1 wherein said conduit having at least one reaction chamber below the surface of the earth.

30. An injection system operable for use with one or more selective oxidizing agents and operable for use in recovering one or more hydrocarbons from a formation, strata, or at least one subterranean reservoir, comprising:
  A. a first fluid container operable to contain at least a first fluid;
  B. a second fluid container operable to contain at least a second fluid;
  C. a third fluid container operable to contain at least a third fluid;
  D. a plurality of pumps operable to pump one or more fluids;
  E. a wellbore extending at least partially into a subterranean formation, strata or reservoir;
  F. a well casing contained at least partially inside said wellbore, said well casing: operable to be in communication with said first fluid container and/or with said second fluid container and comprising one or more perforations or holes in said well casing permitting a fluid inside said well casing to flow out of said well casing;
  G. one or more conduits operable for delivering a fluid into said well casing, including a first conduit, a second conduit, and a third conduit, wherein each is operable for delivering a fluid into said well casing or to a selected location down or near bottom of said wellbore;
  H. one or more conduits operable for recovery of one or more hydrocarbons, wherein recovery of one or more hydrocarbons is through said wellbore;
  I. said injection system comprising further limitations, wherein said injection system comprises:
    i. a selective oxidizing agent for use as a selective oxidizing agent in a combustion reaction in said system, which includes oxygen, and is selective to non-alkane chemistry and non-selective to alkane chemistry, wherein said selective oxidizing agent is operable for preferential attack by oxygen on one or more chemical components in a material wherein said one or more chemical components are not of alkane chemistry;
    ii. a fuel, wherein a said fuel is a non-alkane fuel which is a fluid which includes a plurality of organic chemical components which are not of alkane chemistry and a said fuel is for use in a combustion reaction in said system;
    iii. a acid solution which is a fluid for use to react with reaction products of a combustion reaction in said system, wherein further said acid solution includes a combination of oxalic acid and hydrochloric acid;
    iv. wherein said first fluid at least partially includes a said selective oxidizing agent, wherein utilizing one or more pumps of said plurality of pumps a said first fluid is injected via said first conduit into said well casing to flow down to at or near bottom of said wellbore or out into a formation, strata or reservoir at or near bottom of said wellbore;
    v. wherein said second fluid at least partially includes a said non-alkane fuel, wherein utilizing one or more pumps of said plurality of pumps a said second fluid is injected via said second conduit into said well casing to flow down to at or near bottom of said wellbore or out into a formation, strata or reservoir at or near bottom of said wellbore;
    vi. wherein said third fluid at least partially includes a said acid solution for use to react with reaction products of a combustion reaction in said system, wherein utilizing one or more pumps of said plurality of pumps a said third fluid is injected via said third conduit into said well casing to flow down to at or near bottom of said wellbore or out into a formation, strata or reservoir at or near bottom of said wellbore;
    vii. wherein at a time after a said first fluid and a said second fluid are injected, via said first conduit and said second conduit respectively, into said well casing to flow down to at or near bottom of said wellbore or out into a formation, strata or reservoir at or near bottom of said wellbore, said first fluid and said second fluid or a mixture thereof are operable to cause one or more reactions, wherein said one or more reactions:
      is a reaction of a said selective oxidizing agent and a said non-alkane fuel;
      takes place without being aided by a catalyst; and
      is a combustion reaction, resulting in energy release including heat and creation of one or more reaction products;
    viii. wherein at a time after completion of a said combustion reaction and after a said third fluid is injected via said third conduit into said well casing to flow down to at or near bottom of said wellbore or out into a formation, strata or reservoir at or near bottom of said wellbore and before said heat of said combustion reaction is dissipated, said acid solution of said third fluid is to react with one or more reaction products of said combustion reaction, or a mixture thereof, wherein said reaction of said acid solution with reaction products of said combustion reaction:

is operable to remove said reaction products of said combustion reaction; and is an exothermic reaction, resulting in additional energy release including additional heat.

* * * * *

UNITED STATES PATENT AND TRADEMARK OFFICE
CERTIFICATE OF CORRECTION

PATENT NO. : 10,081,759 B2
APPLICATION NO. : 14/024853
DATED : September 25, 2018
INVENTOR(S) : Eric John Wernimont Page 1 of 1

It is certified that error appears in the above-identified patent and that said Letters Patent is hereby corrected as shown below:

On the Title Page

Add following section:
Related U.S. Application Data
(60) Provisional application No. 61/795,016, filed on October 9, 2012; provisional application No. 61/958,123, filed on July 22, 2013.

Signed and Sealed this
Fourth Day of December, 2018

Andrei Iancu
*Director of the United States Patent and Trademark Office*